Nov. 10, 1970 D. T. DANIELE 3,539,422
PLASTIC FILM LINING MACHINE
Filed May 29, 1968 4 Sheets-Sheet 3
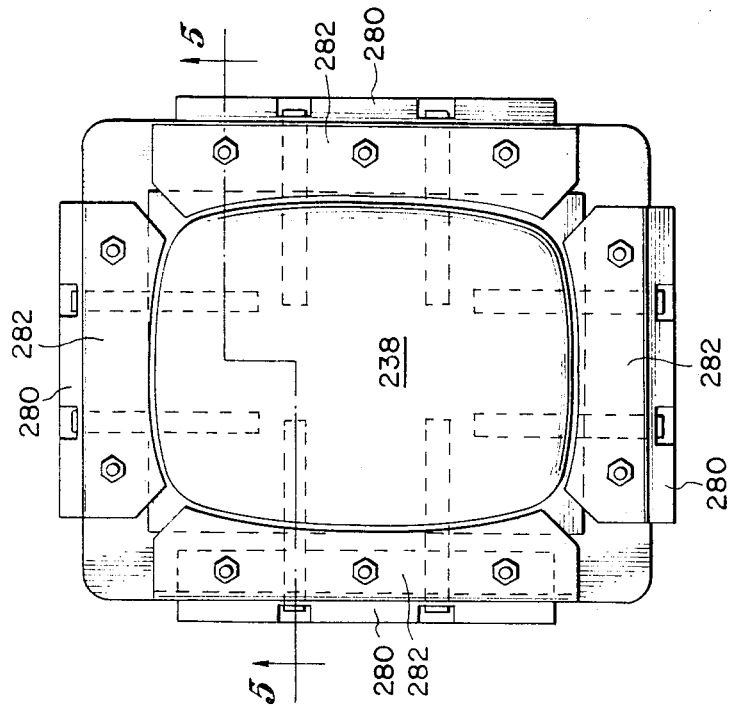
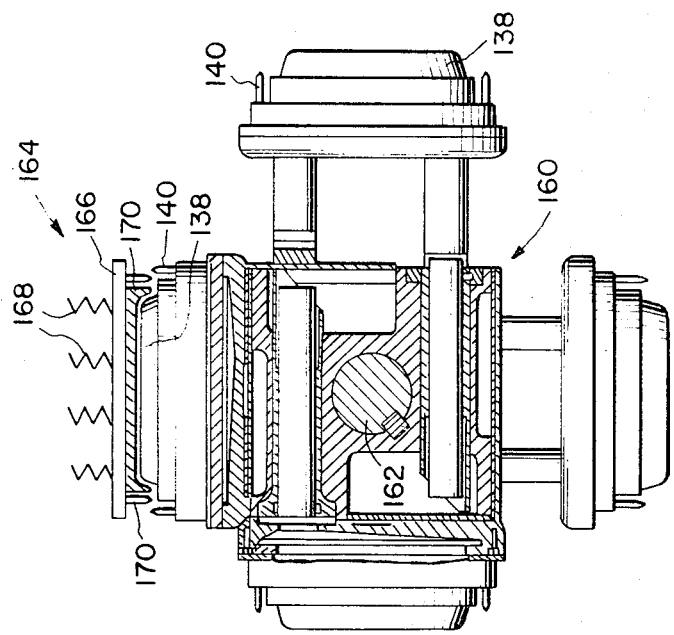
INVENTOR
DONALD T. DANIELE
BY Karl W. Flocks
ATTORNEYS Nov. 10, 1970         D. T. DANIELE         3,539,422
PLASTIC FILM LINING MACHINE
Filed May 29, 1968                       4 Sheets-Sheet 4

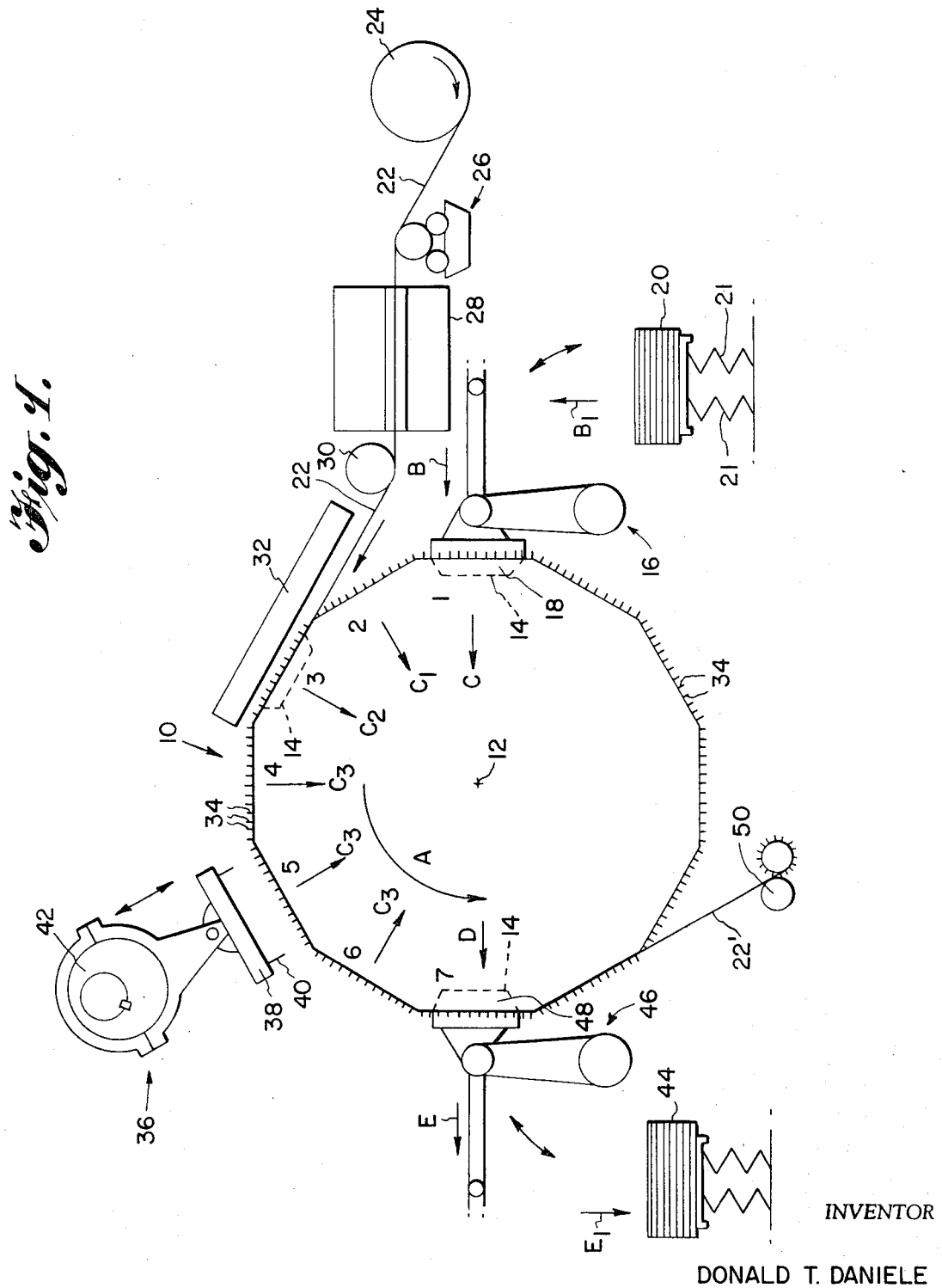

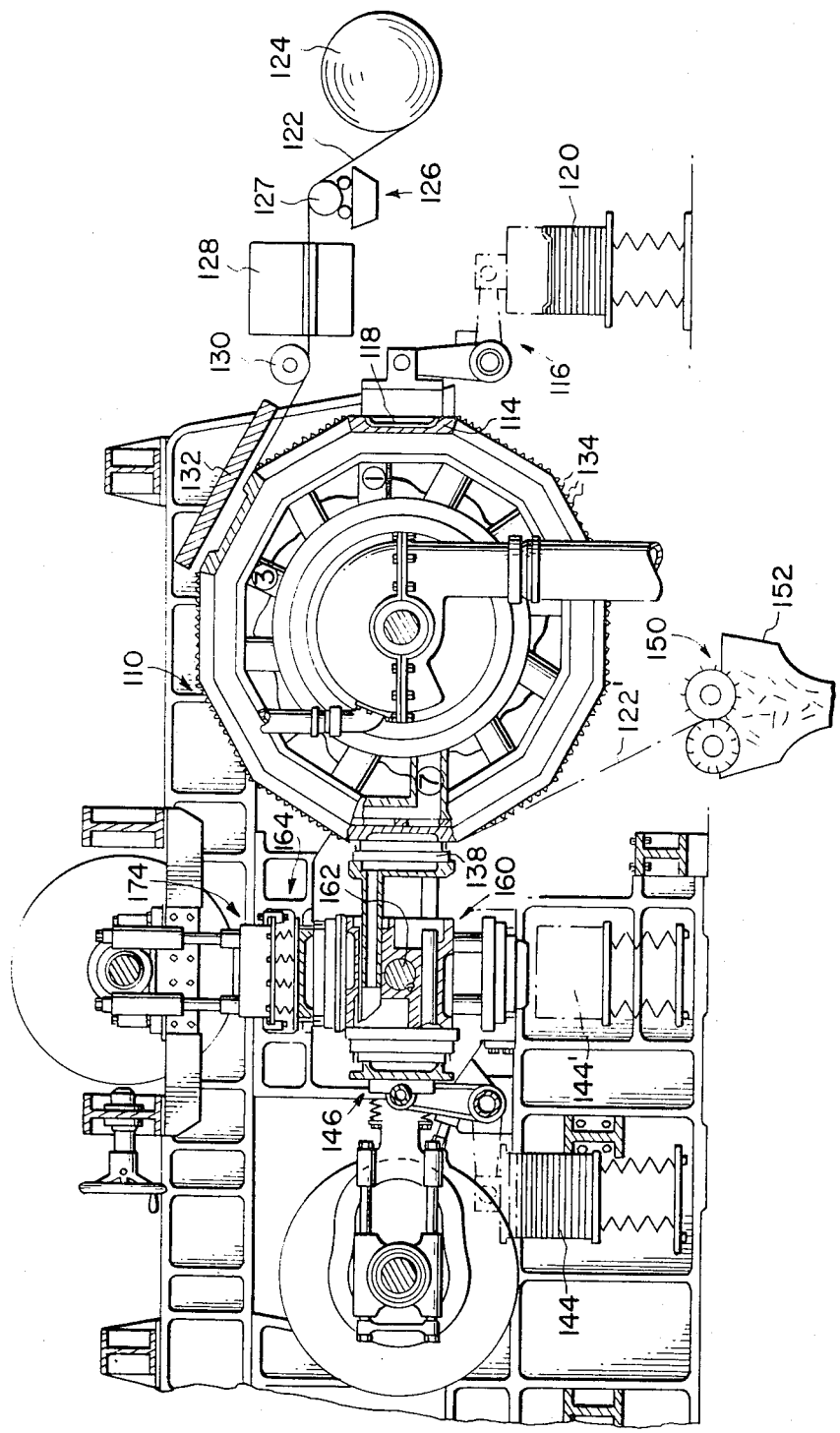

INVENTOR
DONALD T. DANIELE

BY  *Karl W. Flocks*
ATTORNEYS

__United States Patent Office__

3,539,422
Patented Nov. 10, 1970

3,539,422
PLASTIC FILM LINING MACHINE
Donald T. Daniele, East Longmeadow, Mass., assignor to Diamond International Corporation, New York, N.Y., a corporation of Delaware
Filed May 29, 1968, Ser. No. 732,913
Int. Cl. B32b 3/04
U.S. Cl. 156—202                          15 Claims

ABSTRACT OF THE DISCLOSURE

An apparatus is provided comprising a horizontally disposed drum having a plurality of peripheral foraminous dies which drum is driven intermittently. Preformed paperboard or molded pulp trays are sequentially deposited on the drum dies as the drum rotates intermittently past a first station and are held in place thereon by vacuum being drawn through such drum dies. An adhesive plastic web is then guided into face-to-face contact with the tray carrying drum. The plastic web is held in place over the die at a second station by pins extending upwardly from the edges of the die. While in place the film is heated and then a greater degree of vacuum is drawn through the die, causing the heat-softened plastic film to be vacuum thermoformed against the tray where it is bonded into place by the action of the adhesive. From this point the drum continues to rotate and, in one embodiment, a cutting die is provided which cuts through the peripheral portion of the preformed tray and the plastic film to finish the lined tray while still on the drum. In another embodiment, a first cut is made while still on the drum through the plastic so as to separate the lined tray, in unfinished form, from the plastic film which is then chopped up as scrap which may be reused. In the meantime the unfinished lined tray is passed to a rotary turret having dies and is then passed to a second cutting zone where the lined tray is finished, before being transferred from the turret die. In each case the transferring is done by a combination of vacuum and positive air pressure. On the rotary turret, instead of finishing the tray by cutting through the peripheral portions thereof, the finishing operation may be carried out by bending the free plastic edges about the edges of the tray and sealing them or crimping them to the bottom thereof.

---

The present invention relates to a plastic film lining machine and, more particularly, to an apparatus and method for applying a plastic lining to a pre-molded pulp food tray.

The lining of paper-product containers of various types with an impervious plastic film has been known for many years. Many procedures and machines for carrying out such laminating have been devised, and many of these previous systems have been successful to an extent.

However, with the increasing demand for plastic lined paper containers, has come an increased need for faster machines, i.e. increased speed of the laminating operation. This need for faster machines has become particularly acute in recent years but, until the present invention, the older machines operating at slower speeds have had to be relied upon. To meet the increased demand, it has been necessary to use more of the old machines which are inefficient and which take up too much factory space.

It is, accordingly, an object of the present invention to reduce and obviate the deficiencies of the prior art, such as indicated above.

It is another object of the present invention to provide for increased efficiency in the lining of paper product containers.

It is another object of the present invention to provide for the lining of a molded pulp tray with a thin layer of plastic by vacuum thermoforming the plastic over the molded pulp tray and trimming or cutting the finished product to size or wrapping the plastic around the edges of the tray and setting it by crimping.

It is another object of the present invention to provide for the automatic feeding of paper-product trays to a machine where such trays will be lined with plastic, and to automatically and continuously stack the finished lined trays.

It is another object of the present invention to provide a novel high speed tray lining system having a speed which exceeds all present thermoforming machines.

These and other objects and the nature and advantages of the instant invention will be more apparent from the following detailed description of the illustrated embodiments taken in conjunction with the drawing wherein:

FIG. 1 is a schematic illustration of one embodiment of the present invention;

FIG. 2 is a schematic illustration of a second embodiment in accordance with the present invention;

FIG. 3 is a sectional view of a portion of the apparatus of FIG. 2;

FIG. 4 is a plan view of a crimping die used in a third embodiment similar to the embodiment of FIG. 2;

Figure 5A:
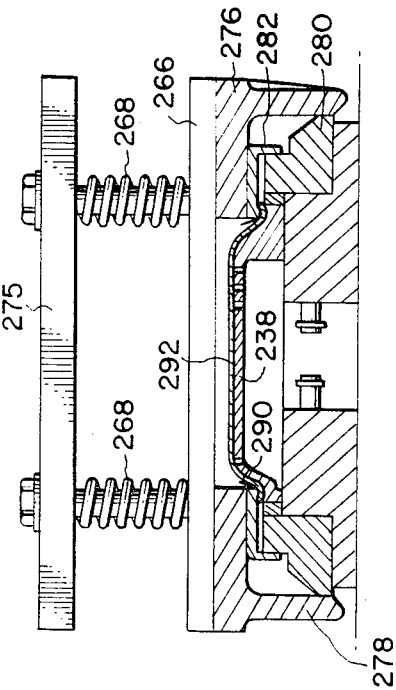
FIG. 5A is a partial view similar to FIG. 5, showing a different stage of operation.

As a basic component of the present system there is provided a rotary drum 10 shown, in FIG. 1, having twelve faces, each such face being provided with a drum die 14. The drum 10 is supported on a horizontal axis 12 about which it is intermittently (in a step-wise manner) rotated in a counter-clockwise direction as shown by the arrow A. The type of drum 10 which is utilized is very similar to those conventionally used in the pulp molding art, an example of which is shown in Pat. No. 3,166,468. In such a drum the dies 14 are each provided with a perforated or otherwise foraminous surface and are each supported at the end of a hollow spoke, through which vacuum and/or air pressure passes. The details of construction of such a drum 10 will be readily apparent to those having normal skill in the art, from a study of Pat. No. 3,166,468 or other patents in the same field.

In conjunction with the drum 10, there is provided a first transferring mechanism 16, comprising a transfer die 18, complementary in configuration to the drum dies 14, such die 18 also being foraminous and connected to a suitable source of vacuum and pressure. The transferring device 16, known per se in the molded pulp art for the transfer of molded pulp articles from a molding drum, may pick up a single unlined molded pulp or paperboard tray from a stack 20 of such trays, or from another suitable source of said tray, by the application of a vacuum through the transfer die 18, as illustrated by the arrow B. Where the stack 20 of trays is used, the proper upper level may be maintained by any suitable means such as springs 21.

While the vacuum supply is maintained, the die 18 moves from its pick-up position to the position illustrated in FIG. 1 into face-to-face contact with a complementary drum die 14 at step No. 1, the unlined tray being trapped between the dies 14 and 18. At this point, transfer is accomplished by differential pressure which preferably involves the application of positive pressure through the transfer die 18 as shown by the arrow B and the use of vacuum drawn through the drum die 14 as shown by the arrow C, it being understood that differential pressure may be accomplished solely by the use of pressure B or solely by the use of vacuum C.

After the unlined tray has been deposited on a drum die 14 on the drum 10 at step 1, the drum continues to intermittently rotate through step 2 to step 3 while vacuum, illustrated by arrow $C_1$, is maintained.

At step 3 the unlined tray is provided with a lining applied in the form of a continuous web of plastic film 22. This web 22 is unwound from a roll 24 and is preferably coated on its bottom surface with a suitable heat sensitive adhesive composition applied by a coating device 26. The film then passes through a suitable heater 28 which effects the evaporation of the adhesive carrier or setting of the adhesive so that the unactivated adhesive exists as a solid layer on the under-surface of the film 22; the heater 28 also serves to preheat the plastic film 22. The film is then passed over a guide roll 30 and beneath a second heater 32, which may comprise a bank of radiant heaters or any other suitable heating means. The purpose of the heater 32 is both to soften the plastic film 22 and to activate the adhesive coating thereon. Various types of adhesives, known to the art, may be used. It may be understood that certain types of plastic film need not be adhesively coated since they are inherently, due to their own surface, capable of bonding to paper, and among such materials is polyethylene, the surface of which has been treated to oxidize the same or by corona discharge.

At Step No. 3 the heat softened film 22 is passed over the drum die 14 and is there retained in place by suitable means, such as pins 34, which project upwardly from the edges of, or from the entire periphery of, the drum die 14. The pins pass upwardly and perforate the film 22 and hold it in place directly over the die 14. In the meantime, at Step No. 3, the vacuum applied, illustrated by arrow $C_2$, through the die 14 is increased and this vacuum passes through the porous paper or pulp tray and acts on the heat softened plastic film 22, thereby vacuum thermoforming the plastic film into intimate contact with the interior of the tray carried on the die 14. Since the heat from the heaters 32 have also activated the adhesive, the film will tightly bond to the interior surface of the paper tray.

As the drum 10 continues to rotate intermittently through steps 4, 5 and 6, vacuum continues to be drawn, maintaining the now lined tray on the drum 10, such vacuum being shown by the arrows $C_3$.

At step No. 5 an opposing cutting and trimming die mechanism 36 is provided which includes a cutting die 38, having an annular cutting blade 40, being driven by suitable means 42 for reciprocating the cutting die 38 in synchronization with the step-by-step movement of the drum 10. In the embodiment illustrated, such a reciprocating means includes an eccentric mounted for rotation with an axle which translates the rotary motion of the axle to a reciprocating motion of the cutting die 38. In place of the illustrated device, any other suitable known reciprocating device may be used, such as a pneumatic or hydraulic piston or a solenoid.

When the lined tray reaches step 5, the cutting die 38 goes downwardly and the annular blade 40 cuts through both the lining film and the peripheral edges of the paper product tray, so as to finish the edges of the tray and provide a finished article. The cutting die then reciprocates upwardly and the drum 10 rotates to position 6 where vacuum $C_3$ is maintained and then to position 7 where the lined tray is transferred from the drum to a stack 44 of finished lined trays by a transferring mechanism 46, which is essentially identical to the aforedescribed transferring mechanism 16 and which includes a foraminous transfer die 48, along with suitable vacuum and air pressure applying means.

In the preferred embodiment, when the tray reaches position 7 on the drum, positive air pressure shown by the arrow D, acting through the drum die 14 in conjunction with vacuum shown by the arrow E acting through the transfer die 48, serves to transfer the lined tray from the drum to the transfer die 48. The transfer device 46 moves to its position 90° from that shown; whereupon positive air pressure shown by the arrow $E_1$ serves to blow the lined tray from the transfer die 48 to the stack 44. In the meantime, scrap film 22' is carried to the lower part of the drum 10 and is passed between a pair of scrap cutting rollers 50.

The device of FIG. 2 is, in many respects, similar to that of FIG. 1, but has an added advantage of permitting reuse of the scrap plastic. This is accomplished by providing an initial cutting operation, wherein the plastic film is severed from the lined tray without taking any paper board or pulp along with the scrap, so that the scrap plastic may be cut and reused.

As in the device of FIG. 1, a web of plastic film is unrolled from a roll 124 of such film. The web 122 passes over the adhesive applicator 126, which deposits the adhesive by means of a roller 127 to the underside of the plastic film 122. The plastic film then passes between a pair of heaters or through a furnace 128 which, depending upon the nature of the adhesive, either dries the same or effects preheating and partial curing thereof. The film 122 then passes over the guide roller 130 and then under the final film heater 132.

The pins 134 on the drum dies 114 hold the plastic film and through motion of the drum 110 pulls the plastic web from the roll 124 to unwind the same and draw it over the glue roll 127 through the heaters 128 and into position for the vacuum thermoforming at step 3 under the film heater 132.

A delivery transferring unit 116, similar to that described above in relation to FIG. 1, picks a preformed and dried molded pulp tray or preformed paperboard tray from a stack 120 thereof, using vacuum to hold the tray in position on its transfer die 118. When the transfer die 118 swings into mating position with the drum die 114 at position 1, air is applied behind the transfer die 118 and light vacuum is applied behind the drum die 114 to transfer the unlined tray to the drum die 114. As the drum rotates intermittently to position 3, light vacuum is maintained to hold the unlined tray on the die 114.

When the die reaches position 3, strong vacuum is applied, causing the film 122 to be tightly drawn against the tray resting on the drum die 114, the vacuum passing not only through the foraminous die 114 but also through the body of the tray due to its porosity. The glue of the film 122 causes the film to tightly adhere and bond to the inner surface of the tray and the atmospheric air presure on the top of the film holds the softened plastic in total contact with the tray.

Vacuum is maintained during the next three steps during which the plastic film cools and sets, thereby providing the film lining for the tray carried by the drum die 114. The plastic sheet is continuous and covers the entire face of the drum and passes between adjacent dies carrying different trays.

When the drum 110 rotates to position 7 it comes in face-to-face contact with a complementary turret cutting die 138, shown in detail in FIG. 3, which is carried by a rotary turret 160. The rotary turret 160 is constructed as described in Pat. No. 3,166,468 so that the die 138 is extended outwardly from the axle 162 of the rotary turret 160 at its location in facing relationship to the drum die 114 when the latter is in position 7, while the turret die 138 then retracts before it rotates in a stepwise manner about the axle 162 in the counterclockwise direction to its next two positions described in greater detail below. Accordingly, when the drum 110 has reached position 7, the die 138 extends into mating position with the complementary die 114 on the drum 110. The turret die 138 is provided with an annular cutter 140 which, when it mates with the drum die 114, cuts through the plastic 122 around each tray. The remaining film 122' is driven from the pins 134 and is carried downwardly into a scrap cutter 150 and collects in a hopper 152.

The film lined tray is transferred to the turret die 138 of the rotary turret 160 from the drum die 114 by means of a combination of air pressure passing through the die 114 and vacuum being applied through the turret die 138, as described above in relation to the various transferring devices.

The film lined tray, now carried by the rotary turret 160, is then rotated into position under a second trimming die structure 164, which includes a plate 166 biased downwardly by springs 168 and carrying on its lower face a complementary pressing die 170 and an annular knife 172. Suitable superstructure 174, described in Pat. No. 3,166,468, is provided for reciprocating the cutting device 164 downwardly. When the lined tray is indexed to position under the second cutter 164, the device 174 forces the cutter 164 downwardly, causing the annular knife 172 to cut through the film and the peripheral edges of the tray itself. This gives a clean, neat edge to the product by trimming the entire circumference of the lined tray.

The trimmed lined tray (with the scrap) is then indexed into position where a second delivery unit 146 removes the finished tray from rotary turret 162, and either places it on a moving belt or onto a stack 144 of such lined trays. If desired, the transfer unit 146 may be used simply to remove the scrap and the product may be stacked at 144'. The scrap comprising the mixture of paper and plastic glued together is discarded.

The glue roll 127 may be provided with a pattern to apply glue only to those areas that will cover the molding dies, if desired, and in this case the scrap plastic will be reclaimed and reused.

In the third illustrated embodiment of the present invention, the basic structure involved is as shown in FIG. 2, except that no second cutter 164 is provided, the structure utilized serving to bend the extra plastic around the peripheral edge of the tray to crimp and bond such plastic to the bottom edge of the tray. In this case, noting FIGS. 4, 5 and 5a, the structure 174 remains the same and includes a plate 275, to which the springs 268 are connected at their upper ends. Extending downwardly from the plate 266 is a crimping cam 276 having a downwardly extending annular flange 278. In addition, the turret die 238 is modified by the association therewith of a peripheral series of crimp plate slides 280, each having mounted thereon a crimp plate 282. The crimp plate slides 280 are slidably spring biased away from the turret die 238 by springs 284 and the crimp plates are each biased away from their respective crimp plate slide 280 by springs 286.

All operations up to the transfer of the film lined tray from the drum 110 to the turret 160 are the same as in the embodiment of FIG. 2, except it is preferred that instead of the film cutting blade 140 being located on the turret die 238, it is preferable that the cutter be located on a device similar to the device 36 of FIG. 1 so that the turret die 238 is not encumbered by such an annular cutting blade 140.

At the position where the turret die 238 is in mating position with the drum die 114 at position 7 of the drum, the crimp plates 282 are pushed back against their springs 286 by the periphery of the drum die 114, thereby exposing the turret die 238 to the drum die 114. As the turret die 238 retracts toward the turret axle 162, the crimp plates 282 are extended by their springs 286 past the turret die 238 now holding the lined tray, plastic face down, thereby bending the plastic overhang 290 to a normal position, as shown in FIG. 5.

Figure 5:
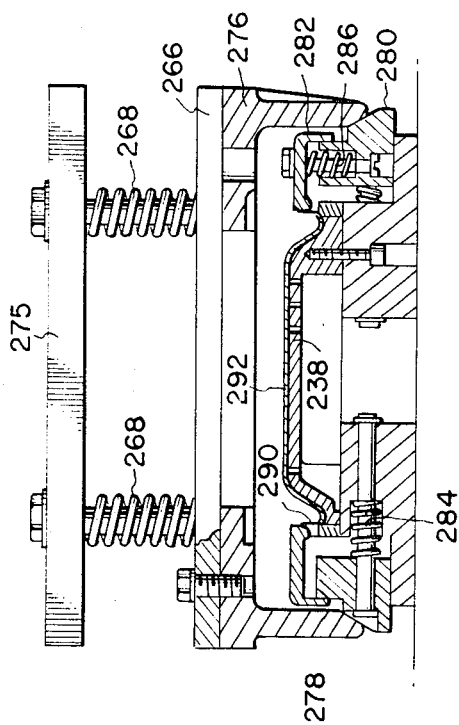
FIG. 5 is a sectional view taken along lines 5—5 of FIG. 4.

The rotary turret 160 then rotates to position under the crimping cam 276 and the crimping cam is forced down by reciprocating structure 174 over the turret die 238, as shown in FIG. 5. As the cam 276 moves downwardly, its annular flange 278 forces the crimp plates 280 toward the turret die 238 against the springs 284. This action folds the plastic over the edge of the tray 292. The continued motion of the cam 276 downwardly causes contact with the top of the crimp plates 282 to thereby force the crimp plates downwardly against their springs 286 to the position shown in FIG. 5a. In the position shown in FIG. 5a, the plastic edges 290 are forced against the back side of the tray 292 and the glued edges adhere to the tray edge, due to the force applied, thereby crimping the edges into position.

The finished product is then stacked as in the embodiment of FIG. 2. No trimming is required in the crimping system of FIGS. 4, 5 and 5a.

It will be obvious to those skilled in the art that various changes may be made without departing from the scope of the invention and that the invention is not to be considered limited to what is shown in the drawings and described in the specification, but only to what is set forth in the claims.

What is claimed is:

1. A method of continuously lining a series of paper-product trays with plastic film comprising:

transferring a paper-product tray to complementary shaped die located along the periphery of a generally cylindrical drum, said drum rotating about its axis in a step-wise manner and having a series of said dies along its periphery, and applying vacuum through said drum die to hold said tray therein;

passing a continuous web of thin, stretchable, impervious plastic film over said tray carried by said drum die, heat-softening said plastic film, gripping the edges of said film along the periphery of said drum, and applying increased vacuum to said tray, thereby drawing vacuum through said tray and stretching said web into conformity with the interior of said tray where it bonds thereto by vacuum thermoforming;

cutting through the peripheral portion of said lined tray to finish the edge thereof and to separate said lined tray from said plastic web; and transferring said lined tray from said drum by applying a pressure differential between the top and bottom surfaces of said lined tray.

2. A method of continuously lining a series of paper-product trays with plastic film comprising:

transferring a paper-product tray to complementary shaped die located along the periphery of a generally cylindrical drum, said drum rotating about its axis in a step-wise manner and having a series of said dies along its periphery, and applying vacuum through said drum die to hold said tray therein;

passing a continuous web of thin, stretchable impervious plastic film over said tray carried by said drum die, heat-softening said plastic film, gripping the edges of said film along the periphery of said drum, and applying increased vacuum to and through said tray, thereby vacuum theremoforming said web into conformity with the interior of said tray where it bonds thereto;

cutting through said film web about the edges of said tray to separate said lined tray from said web and transferring said lined tray by pressure differential to a turret die on the periphery of a rotary turret rotating step-wise about its axis in synchronization with said drum;

cutting through the peripheral portion of said lined tray to finish the edge thereof; and transferring said finished lined tray from said turret die by applying air pressure to the bottom of said tray.

3. A method of continuously lining a series of paper-product trays with plastic film comprising:

transferring a paper-product tray to a complementary shaped die located along the periphery of a generally cylindrical drum, said drum rotating about its axis in a step-wise manner and having a series of said dies along its periphery, and applying vacuum through said drum die to hold said tray therein;

passing a continuous web of thin stretchable, impervious plastic film over said tray carried by said drum die, heat-softening said plastic film, gripping the edges of said film along the periphery of said drum, and applying increased vacuum to and through said tray, thereby vacuum thermoforming said web into conformity with the interior of said tray where it bonds thereto;

cutting through said film web about the edges of said tray to separate said lined tray from said web and transferring said lined tray by pressure differential to a turret die on the periphery of a turret rotating step-wise about its axis in synchronization with said drum;

wrapping the peripheral portion of said film about the edges of said tray and crimping said peripheral portion into bonding relation with the underside of the tray edge;

and transferring said lined tray from said turret die by applying air pressure to the bottom of said tray.

4. Apparatus for continuously lining a series of paper-product trays with plastic film comprising:

a generally cylindrical drum having a central axis of rotation and a series of foraminous dies disposed along its periphery, means to rotate said drum intermittently about said axis, and film holding pins located about said drum along the edges of said drum dies;

means to deposit an unlined paper-product tray on each said die as it moves past a first station;

means to guide a web of stretchable, impervious plastic film into location above each said die carrying an unlined tray and into contact with said film holding pins as said drum die moves past a second station, means to heat said film in the vicinity of said second station and means to apply vacuum to and through said drum die at said second station to draw the plastic film against the paper-product tray to effect lamination therewith;

means to cut through the peripheral portions of the tray and plastic films at a third station to separate the lined tray on said die from the following lined tray and to finish the edges of said lined tray;

and means to transfer said lined tray from said drum at a fourth station.

5. Apparatus for continuously lining a series of paper-product trays with plastic film comprising:

a generally cylindrical drum having a central axis of rotation and a series of foraminous dies disposed along its periphery, means to rotate said drum intermittently about said axis, and film holding pins located about said drum along the edges of said dies;

means to deposit an unlined paper-product tray on each said die as it moves past a first station;

means to guide a web of stretchable, impervious plastic film into location above each said die containing an unlined tray and into contact with said film having pins as said die moves past a second station, means to heat said film in the vicinity of said second station and means to apply vacuum to and through said die at said second station to draw the plastic film against the paper-product tray to effect lamination therewith;

a rotary turrent carrying a plurality of turret dies about its surface, said dies being complementary to the dies of said drum, said turret being synchronized with and in die-to-die contact with said drum at a third station, said turret dies each being provided with means to cut through the film about the edges of the tray to separate the lined tray from the plastic film at said third station when said turret die mates with said drum die carrying said lined tray, and means to transfer said lined tray from said drum die to said turret die;

second cutting means at a fourth station along the rotary travel of said turret for cutting through the peripheral portion of said lined tray to finish the edge thereof; and means to transfer the finished lined tray from said rotary turret.

6. Apparatus for continuously lining a series of paper-product trays with plastic film comprising:

a generally cylindrical drum having a central axis of rotation and a series of foraminous dies disposed along its periphery, means to rotate said drum intermittently about said axis and film holding pins located about said drum along the edges of said die;

means to deposit an unlined paper-product tray on each said die as it moves past a first station;

means to guide a web of stretchable, impervious plastic film into location above each said die carrying an unlined tray and into contact with said film holding pins as said drum die moves past a second station, means to heat said film in the vicinity of said second station and means to apply vacuum to and through said drum die at said second station to draw the plastic film against the paper-product tray to effect lamination therewith;

a rotary turret carrying a plurality of turret dies about its surface, said dies being complementary to the dies of said said drum, said turret being synchronized with and in die-to-die contact with said drum at a third station, said turret dies each being provided with means to cut through the film about the edges of the tray to separate the lined tray from the plastic film at said third station when said turret die mates with said drum die carrying said lined tray, and means to transfer said lined tray from said drum die to said turret die;

means for wrapping the peripheral portion of said film about the edges of the lined tray carried by said turret die at a fourth station and for crimping the peripheral portion into bonding relation with the underside of the tray edge to finish the tray; and means to transfer the finished lined tray from said rotary turret die.

7. A method in accordance with claim 1, wherein said continuous web of thin, stretchable, impervious plastic film is first coated with glue on one side thereof, which glue is then dried prior to said passing of said web into contact with said tray, said glue being heat activatable glue, which bonds said plastic film to said tray.

8. A method in accordance with claim 1, wherein said continuous web of thin stretchable, imprevious plastic film comprises a plastic which is self-adherable to said tray under the effect of heat and pressure.

9. A method in accordance with claim 1, wherein a combination of vacuum and positive pressure are utilized to transfer said paper-product tray to said drum die and wherein a vacuum is continuously applied to said-drum die until said lined tray is transferred from said drum die by the application of positive pressure through said drum die and the simultaneous application of vacuum to the top of said lined tray.

10. An apparatus in accordance with claim 4 further comprising means to continuously apply the glue to the undersurface of the web of stretchable, impervious plastic film, means to dry the so applied glue located downstream from said glue applying means, said glue applying means and drying means being located upstream from said web guiding means.

11. Apparatus in accordance with claim 4 wherein said means to deposit an unlined paper-product tray on each said die as it moves past a first station comprises a foraminous transfer die, means to apply vacuum through said transfer die to pick a paper-product tray from a stack of such trays, means to carry said transfer die to said first station, and means to apply positive air pressure through said transfer die to transfer said paper-product tray therefrom to said drum die at said first station; and wherein said means to transfer said lined tray from said drum at a fourth state comprises another foraminous transfer die, means to apply a vacuum through said other transfer die at said fourth station to draw said lined tray from said drum die to said other transfer die, means to move said other transfer die while applying vacuum therethrough, and means to apply positive air pressure through said other transfer die to deposit said lined tray.

12. Apparatus in accordance with claim 4, wherein said means to cut throught the peripheral portions of the tray and plastic film at a third station separate the lined tray on said die from the following lined tray comprises a reciprocating cutting die having an annular cutting blade extending in the peripheral pattern desired for the lined tray.

13. Apparatus in accordance with claim 5, wherein said second cutting means at said fourth station comprises a reciprocating die having a downwardly projecting, annular, peripherally defining cutting blade.

14. Apparatus in accordance with claim 5, further comprising means to cut the scrap plastic web from which said lined tray has been severed by said turret dies.

15. Apparatus in accordance with claim 6, wherein said means of wrapping the peripheral portion of said film about the edges of the lined tray and for crimping the peripheral portion in bonding relation with the underside of the tray to finish the tray comprises a series of crimp plate slides extending peripherally about said turret die, springs for biasing said crimp plate slide outwardly from the periphery of said die, a series of crimp plates each mounted on a crimp plate slide for movement therewith, a second series of springs perpendicular to said first springs and biasing each said crimp plate away from each said crimp plate slide, a crimping cam for contacting said crimp plate slides and forcing said slides inwardly against said first springs, thereby moving said slides and crimp plates towards the periphery of said turret die and then forcing said crimp plates downwardly against said second springs to force said crimp plates against the peripheral portions of the plastic film liner to force same into bonding contact with the underside of the peripheral portion of said lined tray carried by said turret die, and means to so force said crimping cam first into contact with said crimp plate slide and then into contact with said crimp plates.

References Cited

UNITED STATES PATENTS

| | | | |
|---|---|---|---|
| 3,033,737 | 5/1962 | Peters | 156—522 |
| 3,166,468 | 1/1965 | Daniele et al. | 162—392 |
| 3,273,307 | 9/1966 | Burt | 53—228 |

SAMUEL W. ENGLE, Primary Examiner

U.S. Cl. X.R.

156—216, 267, 269, 522, 567